(12) United States Patent
Hurley et al.

(10) Patent No.: US 8,010,447 B2
(45) Date of Patent: Aug. 30, 2011

(54) OPERATIONAL RISK CONTROL APPARATUS AND METHOD FOR DATA PROCESSING

(75) Inventors: Steven Michael Hurley, Plano, TX (US); Barry Douglas Whyte, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 502 days.

(21) Appl. No.: 12/044,900

(22) Filed: Mar. 7, 2008

(65) Prior Publication Data

US 2008/0195407 A1 Aug. 14, 2008

Related U.S. Application Data

(63) Continuation of application No. PCT/EP2006/064859, filed on Jul. 31, 2006.

(30) Foreign Application Priority Data

Sep. 9, 2005 (GB) .................................... 0518405.6

(51) Int. Cl.
*G06Q 40/00* (2006.01)
(52) U.S. Cl. .......... 705/38; 702/186; 702/183; 702/187; 711/170; 711/171; 711/172
(58) Field of Classification Search ............... 705/38; 702/186, 183, 187; 711/170, 171, 172
See application file for complete search history.

(56) References Cited

U.S. PATENT DOCUMENTS

| | | | | |
|---|---|---|---|---|
| 6,912,482 B2 * | 6/2005 | Kaiser | ............ | 702/186 |
| 7,356,452 B1 * | 4/2008 | Naamad et al. | ............ | 703/22 |
| 7,539,835 B2 * | 5/2009 | Kaiser | ............ | 711/170 |
| 2004/0054618 A1 * | 3/2004 | Chang et al. | ............ | 705/38 |

* cited by examiner

*Primary Examiner* — Daniel S Felten
(74) *Attorney, Agent, or Firm* — GSS Law Group

(57) ABSTRACT

An apparatus for controlling operational risk in a data processing system comprises a risk domain segmenter for segmenting the data processing system into a plurality of risk domains, a domain risk threshold selector for selecting a domain risk threshold for at least one of the plurality of risk domains, a system element monitor operable to query the data processing system for an indication of presence of system elements, a risk quantizer for evaluating a system element for element risk and for computing the potential contribution of the element risk to a domain risk total, a risk threshold comparator for comparing the domain risk total with the domain risk threshold, and a domain assignor operable to assign the system element to a risk domain in dependency upon an output of the risk threshold comparator.

18 Claims, 2 Drawing Sheets

OPERATIONAL RISK CONTROL APPARATUS AND METHOD FOR DATA PROCESSING

RELATED APPLICATIONS

This application is a continuation of PCT application number PCT/EP2006/064859, filed on Jul. 31, 2006, which claims benefit of application number 0518405.6, filed in Great Britain on Sep. 9, 2005.

FIELD OF THE INVENTION

The present invention relates to technical measures for controlling operational risk in data processing systems, and more particularly to controlling operational risk in networked data processing systems.

BACKGROUND

Currently, the architecture of networks, such as storage networks, is largely designed around the fact that requirements for data storage, and thus storage systems themselves, are growing ever larger and need to accommodate incompatible systems supplied by different vendors. As systems are scaled up to accommodate rising processing needs, applications and services reliant on the network are exposed to increased risk. As more elements are deployed into a network the overall risk within that network increases. Thus, the larger the scale of the system, the greater the probability that a software failure, hardware failure or administration error can propagate itself across larger numbers of information technology (IT) system elements and thus impact a larger portion of a business.

There is at present no known design approach that systematically considers risk as a controlling factor in the design of network architectures. That is, there are no mechanisms for accurately quantifying the operational risk posed to a business by its IT infrastructure and for mitigating that risk in ways that are demonstrable. Without such a risk control mechanism, businesses are unable to consistently manage risk of failure except at the expense of over-investment and over-allocation of resources. Consequently, a high level of investment is made in business resiliency, some of which investment may be excessive or poorly-targeted.

It is known, for example from publication US2004/0054618, to Chang and Ashutosh, entitled "Software application domain and storage domain risk analysis process and method", to use various techniques for assessing the technical risks of failure inherent in computing system elements such as software applications and data storage devices. However, the assessment techniques contemplated therein go no further than providing the user with information relating to the technical risk involved in using such computing system elements. The level of criticality to the business of the elements of risk is not considered, and the uses to which the information is put are left open.

It would thus be desirable to have technical measures for quantifying computing system risk with reference to both the business importance and the estimated probability of failure of the infrastructure elements and to have a technological apparatus, logic arrangement or method to incorporate appropriate risk-mitigation into systems at the design level.

SUMMARY

The present invention accordingly provides, in a first aspect, an apparatus for controlling operational risk in a data processing system; said apparatus comprising: a risk domain segmenter for segmenting said data processing system into a plurality of risk domains; a domain risk threshold selector for selecting a domain risk threshold for at least one of said plurality of risk domains; a system element monitor operable to query said data processing system for an indication of presence of system elements; a risk quantizer for evaluating a system element for element risk and for computing the potential contribution of said element risk to a domain risk total; a risk threshold comparator for comparing said domain risk total with said domain risk threshold; and a domain assignor operable to assign said system element to a risk domain in dependency upon an output of said risk threshold comparator.

Preferably, said potential contribution is positive and increases said domain risk total.

Preferably, said potential contribution is negative and reduces said domain risk total.

Preferably, said risk threshold is operable as a budget value to be drawn from by a risk value drawer operating subtractively using one or more said element risk values.

Preferably, said risk threshold is operable as an upper limit to be approached by a risk value accumulator operating additively using one or more said element risk values.

Preferably, said system element comprises at least one of: an application, a host system, a data storage system, an I/O system and a data communication system.

Preferably, said element risk value incorporates a weighting factor for criticality of function.

Preferably, said element risk value incorporates an element reliability factor.

Preferably, said plurality of risk domains is arranged in tiers of a hierarchy.

Preferably, each of said tiers of a hierarchy is assigned a management condition.

Preferably, said management condition comprises at least one of: function duplication, backup, mirroring and hot standby.

Preferably, said system element comprises a storage area network.

Preferably, said storage area network is operable to be divided into domains by means of a virtualization component.

In a second aspect, the present invention provides a method for controlling operational risk in a data processing system and comprising steps of: segmenting, by a risk domain segmenter, said data processing system into a plurality of risk domains; selecting, by a domain risk threshold selector, a domain risk threshold for at least one of said plurality of risk domains; querying, by a system element monitor, said data processing system for an indication of presence of system elements; evaluating, by a risk quantizer, a system element for element risk and computing the potential contribution of said element risk to a domain risk total; comparing, by a risk threshold comparator, said domain risk total with said domain risk threshold; and assigning, by a domain assignor, said system element to a risk domain in dependency upon an output of said risk threshold comparator.

Preferably, said potential contribution is positive and increases said domain risk total.

Preferably, said potential contribution is negative and reduces said domain risk total.

Preferably, said risk threshold is operable as a budget value to be drawn from by a risk value drawer operating subtractively using one or more said element risk values.

Preferably, said risk threshold is operable as an upper limit to be approached by a risk value accumulator operating additively using one or more said element risk values.

Preferably, said system element comprises at least one of: an application, a host system, a data storage system, an I/O system and a data communication system.

Preferably, said element risk value incorporates a weighting factor for criticality of function.

Preferably, said element risk value incorporates an element reliability factor.

Preferably, said plurality of risk domains is arranged in tiers of a hierarchy.

Preferably, each of said tiers of a hierarchy is assigned a management condition.

Preferably, said management condition comprises at least one of: function duplication, backup, mirroring and hot standby.

Preferably, said system element comprises a storage area network.

Preferably, said storage area network is operable to be divided into domains by means of a virtualization component.

In a third aspect, there is provided a computer program comprising computer program code to, when loaded into a computer system and executed thereon, cause said computer system to perform all the steps of a method according to the second aspect, and preferably comprising computer program code corresponding to the steps of the preferred features of the second aspect.

In a fourth aspect, there is provided a computer implemented method of deploying a service comprising steps of deploying computer program code operable to, when deployed into a computer infrastructure and executed thereon, cause said computer system to perform all the steps of a method according to the second aspect, and preferably comprising deploying computer program code corresponding to the steps of the preferred features of the second aspect.

The invention thus contemplates, in its broadest aspect, a technical framework for quantifying and controlling business risks posed by dependence on IT software and infrastructure.

BRIEF DESCRIPTION OF THE DRAWINGS

A preferred embodiment of the present invention will now be described, by way of example only, with reference to the accompanying drawing figures, in which.

DESCRIPTION

Figure 1:
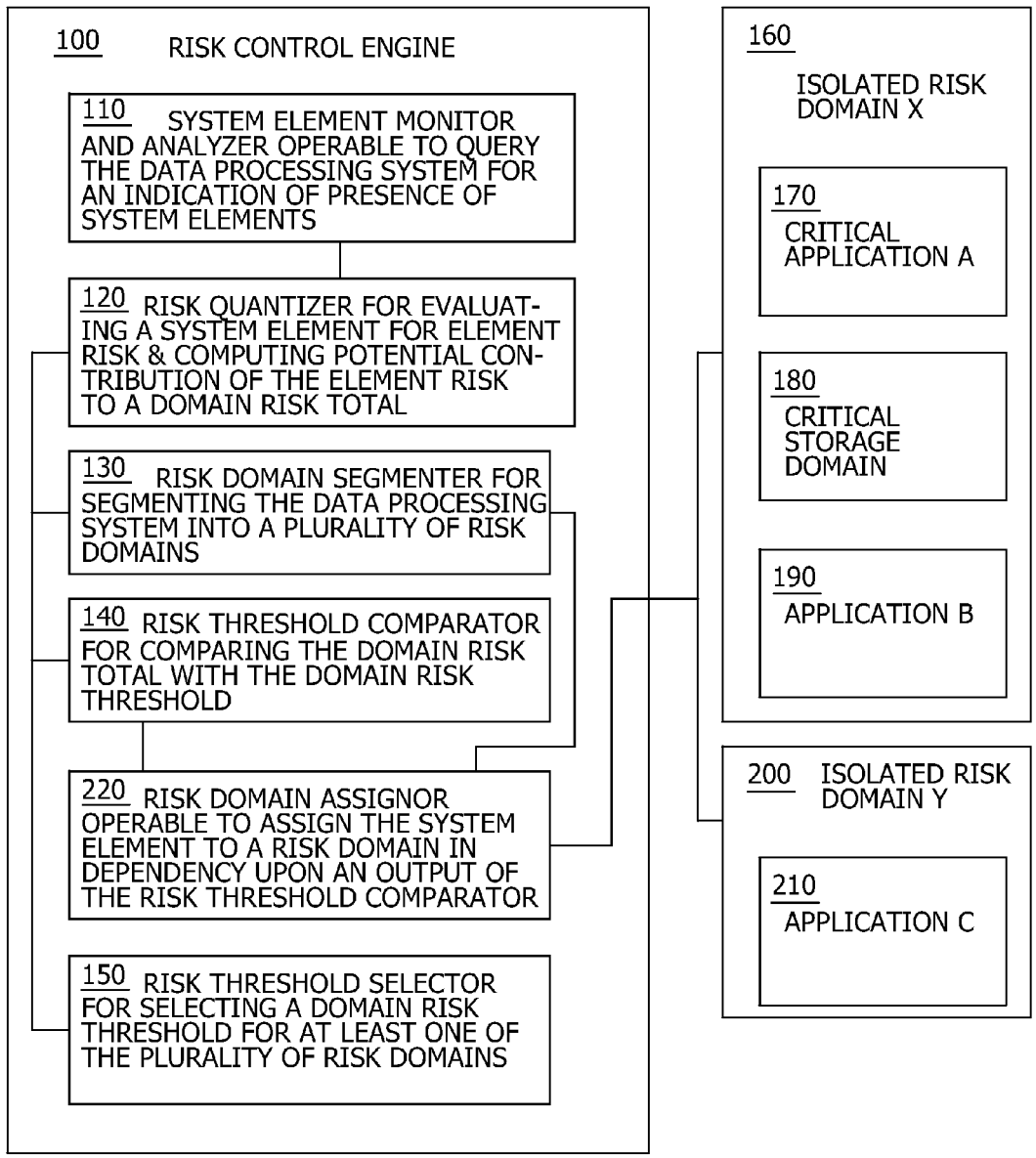
FIG. 1 shows in schematic form an apparatus in accordance with a preferred embodiment of the present invention.

The preferred embodiment of the present invention addresses the problem of risk mitigation within network environments, especially storage network environments, by using risk-driven system segmentation to create isolated risk domains. These isolated risk domains are hereinafter referred to as IRDs. IRDs are infrastructure segments architected to limit operational risk using, in a storage network example, block-level and file-level storage virtualization. This segmentation, physical or logical, is used to limit the extent to which an actualized risk (i.e. a failure) can be propagated across and affect network-connected operating environments, applications or services.

The amount, or quantum, of risk permitted within an IRD may be denoted by a threshold that defines the maximum risk capacity that can be permitted within the IRD. As elements are added to an IRD the current risk contained within the IRD increments from the empty state towards the maximum state as defined by the threshold. In one embodiment, the threshold can be expressed as a total capacity which cannot be exceeded as new elements are added to an IRD. In one alternative embodiment, the threshold can be expressed as a budget from which appropriate deductions are made as new elements are added.

The impact of each new element added to an IRD is a function of the element's importance to the overall IRD. Elements whose role is highly critical to the IRD's intended function have a greater weight and, thus, a larger impact on an IRD's current "risk contained" value as it moves toward the maximum risk capacity threshold. Similarly, elements whose role is less critical have a smaller weight and a smaller impact to an IRD's current "risk contained" value.

Thus an element may be given a score or weighting based on its criticality to a business function as well as its likelihood of failure. Considered thus, each element may be characterized as:
1. Critical and reliable
2. Critical and unreliable
3. Non-critical and reliable
4. Non-critical and unreliable.

Each of these combinations may thus be accorded an overall risk value, and the segmentation of the system is preferably based thereon.

As an example of one application of the preferred embodiment of the present invention, the discrete IRDs, once created and populated with elements, may be classified into tiers based on the business importance and risk level of the elements contained within each member IRD. For example, an IRD containing elements (applications, software, servers, storage, etc.) of a highly critical nature to the operation of the dependent business and having inherently high element risks or dependencies might be classified as a Tier 1 IRD. However, an IRD containing elements of only a moderately critical or risk-prone nature might be classified as a Tier 3 IRD. The tier classification allows different kinds of IRDs to be managed independently as appropriate to their importance to the operation of the dependent business. Such considerations as risk threshold, administrative authorizations, management and maintenance cycles and change control policies can be tailored to the requirements of the specific tier. The total risk that the dependent business is willing to tolerate within an IRD or a specific tier is defined by the risk threshold for that tier.

A preferred embodiment of the present invention works by using storage virtualization (storage network virtualization, block storage virtualization and file storage virtualization) and segmentation (physical and logical) to contain risk and mitigate against failure event propagation. A tiered logic is preferably applied to IRDs to define management policies and maximum risk capacity on a per-tier basis. IRDs within a tier would then be set up to have equivalent and consistent policies and risk capacity. A dependent business could define as many tiers as it deems prudent to manage the spectrum of risk points it is able to tolerate.

In a preferred embodiment, the present invention provides a technical means of controlling operational risk within an IT environment by using aggregation algorithms to incorporate values representing the risk contributions of individual elements within the infrastructure as they propagate through the various relationships and dependencies within the environment. The overall risk may be expressed as a probability of outage over a specified length of time (for example, 0.00001 risk of outage over the next year).

An element, in this sense, may be any circumscribable hardware, software or logical entity (for example, a disk pool or a file system) within the IT infrastructure.

Turning to FIG. 1, there is shown an arrangement of apparatus according to a preferred embodiment of the present invention.

Risk control engine 100 comprises a system element monitor and analyzer 110, which queries the network and acquires information relating to all elements within the hierarchy of the infrastructure. Risk quantizer 120 then associates a risk value with each element of the hierarchy. Examples shown are critical application A 170, critical storage domain 180, application B 190 and application C 210. The risk values are assigned both in terms of the intrinsic operational risks associated with individual elements and of the risks due to clustered and non-clustered dependencies of elements. Risk values may also, in one embodiment, take into account the criticality of the element to one or more business functions. For example, an application or database may be used in real-time transaction processing, in which case its importance to the business may be reflected in a weighting factor incorporated in its risk value. More details of the dependencies will be found below. Risk domain segmenter 130 is then operable to create IRDs each of which is assigned a risk threshold by risk threshold selector 150. During normal operation of the system, system element monitor and analyzer periodically queries the network and acquires information relating to new elements within the hierarchy of the infrastructure. The information is made available to risk quantizer 120, which associates a risk value with any new element of the hierarchy that has been discovered. Risk quantizer 120 is further operable to recalculate the risks due to clustered and non-clustered dependencies of new elements and any elements affected by the introduction of new elements. Risk threshold comparator 140 is operable to compare the potential risk aggregate values for any affected IRDs with the thresholds that were assigned by risk threshold selector 150. Should a potential risk value cause the risk threshold for any IRD to be exceeded by the introduction of new elements, risk domain segmenter 130 is operable to create a new IRD which is assigned a risk threshold by risk threshold selector 150. Risk domain assignor 220 is then operable to assign the new element to the newly-created IRD. If, on the other hand, the potential risk value would not cause the risk threshold for the IRD to be exceeded by the introduction of the new element, risk domain assignor 220 is operable to assign the new element to the original IRD.

In the exemplary structure illustrated in FIG. 1, for example, the IRD shown as isolated risk domain X 160 was created within the IT hierarchy and was initially populated with critical application A 170, critical storage domain 180 and application B 190. At some point, application C 210 is installed in the system. System element monitor and analyzer queries the network and acquires information relating to new application C 210.

The information is made available to risk quantizer 120, which associates a risk value with new application C 210. Risk quantizer 120 is invoked to recalculate the risks due to clustered and non-clustered dependencies of new application C 210 and any elements affected by the introduction of new application C 210. Risk threshold comparator 140 is then invoked to compare the potential risk aggregate value for isolated risk domain X 160 with the threshold that was assigned to it by risk threshold selector 150. The risk threshold in this exemplary case for isolated risk domain X 160 would be exceeded by the introduction of new application C 210, and thus risk domain segmenter 130 is invoked to create a new IRD, isolated risk domain Y 200, which in turn is assigned a risk threshold by risk threshold selector 150. Risk domain assignor 220 then assigns the new element to isolated risk domain Y 200.

Figure 2:
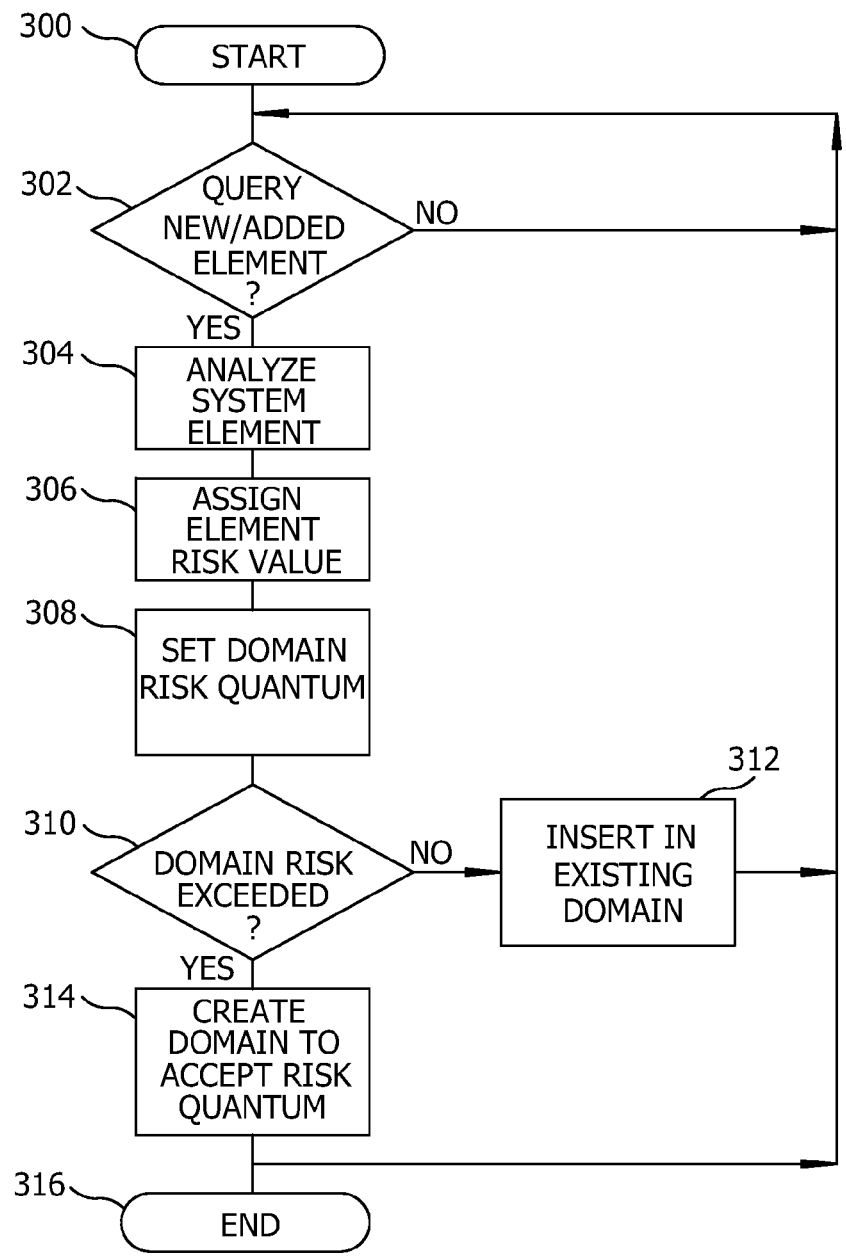
FIG. 2 shows in flowchart form one method or one logic arrangement in which a method of operation according to a preferred embodiment of the present invention may be implemented.

Turning now to FIG. 2, there are shown in flowchart form the steps of a method or logic arrangement according to a preferred embodiment of the present invention.

Thus, the method or operation of the logic arrangement commences at START step 300. At step 302, the system is queried to discover new or added elements. In the first instance, all elements of the system are discovered in step 302. At step 304, the elements are analyzed to determine their intrinsic and dependency risk values, and at step 306, each element is assigned an element risk value. At step 308, the or each domain is assigned a domain risk quantum. If it is determined at test step 310 that the incorporation of an element in the domain would cause the domain risk threshold to be exceeded, a new domain is created at step 314 and the element, with its risk value, is incorporated in that domain. If incorporation of the element in the existing domain would not cause the domain risk threshold to be exceeded, the element, with its risk value, is incorporated in the existing domain at step 312. The method or operation of the logic arrangement concludes at END step 316.

Consider, for example, a three-tiered network design in which each tier is mirrored to a remote recovery site. Though this example contemplates all three tiers being mirrored to a remote recovery site, this need not be the case. Considerations such as remote site mirroring are a function of the management policies defined for a tier. If the dependent business deems it appropriate, a fourth domain tier could be used to contain those elements whose importance does not warrant mirroring in this way.

The networking infrastructure architecture of the preferred embodiment can be implemented by adapting existing systems. Once the maximum risk capacity threshold and associated management policies have been defined for each tier, the implementation comprises steps of creating the logical networks (for example, virtual storage area networks (SANs)) or physical networks (for example, physical SANs) and populating them according to the policies.

The preferred embodiment incorporates values representing three kinds of risk signals when considering the risk that an element will fail:

1. Intrinsic Risk Signal: An intrinsic signal is a risk signal that is specific to single element within the IT environment and is not directly dependent on any other element within the environment. An element's intrinsic risk signal may be expressed as a probability of outage per unit time. An element's intrinsic risk signal is the output of a risk calculation algorithm that can rely upon a variety of parameters including OEM availability data across an install base, field defect rates, hardware failure rates, failure prediction data, failure prediction algorithms, expired fraction of maximum service hours, and other sources of availability or risk data.

2. Non-Clustered Dependency Risk Signals: A non-clustered dependency signal is a risk signal propagated up to an element from a single element on which the receiving element has a dependency. For example, an application could receive a dependency signal from the server on which it runs indicating the probability per unit time that the server may experience an outage. In effect, non-clustered dependency signals model relationships that operate additively in contributing to an overall risk value for an element of an IT environment.

3. Clustered Dependency Risk Signal: A clustered dependency signal is similar to a non-clustered signal except that the dependency can be satisfied by a subset of multiple underlying elements each capable of equivalently contributing to the satisfaction of the dependency. The number of underlying elements can be sufficient to or greater than that which is necessary to satisfy the dependency. In the event that the number is greater than that necessary to satisfy the dependency, clustered dependency signals model relationships that mitigate risk within an IT environment by "bracing" with a plurality of equivalent peers. Thus, clustered dependency risk may thus operate subtractively in contributing to an overall risk value for an element of an IT environment.

For each element, the intrinsic risk signal and any non-clustered and clustered dependency risk signals may be manipulated using an appropriate algorithm to calculate an overall risk of an outage. This overall or aggregate number represents the probability per unit time that an outage may occur within this element or its underlying dependencies. Moving up through the hierarchy of elements in a specific IT environment, the technique provides a value representing the aggregated values of all the subordinate elements on which a specific business process or endeavor depends. This top-level value represents the probability per unit time that an outage may occur within the structure and impact the business.

Thus, in a preferred embodiment, the present invention systematically assembles a risk structure representing the overall risk to the business of all elements within the architecture and provides a mechanism for the mitigation of risk within the IT environment by providing appropriately isolated and independently manageable domains. The risk is therefore managed both in terms of the intrinsic operational risks associated with individual elements and of the risks due to clustered and non-clustered dependencies of elements. This risk structure is used in the first instance at system setup and is then used to monitor and mitigate ongoing risk as existing hardware or software elements live out their life cycle, as new elements are deployed and as new architectural strategies (such as multi-site mirroring) are deployed.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In an alternative, the preferred embodiment of the present invention may be realized in the form of a computer implemented method of deploying a service comprising steps of deploying computer program code operable to, when deployed into a computer infrastructure and executed thereon, cause said computer system to perform all the steps of the method.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, or use of equivalent functional steps for steps described herein. Such insubstantial variations are to be considered within the scope of what is contemplated here. Moreover, if plural examples are given for specific means, or steps, and extrapolation between or beyond such given examples is obvious in view of the present disclosure, then the disclosure is to be deemed as effectively disclosing and thus covering at least such extrapolations.

Unless expressly stated otherwise herein, ordinary terms have their corresponding ordinary meanings within the respective contexts of their presentations, and ordinary terms of art have their corresponding regular meanings.

What is claimed is:

1. An apparatus for controlling operational risk in a data processing system, comprising:
    a risk domain segmenter for segmenting said data processing system into a plurality of risk domains;
    a domain risk threshold selector for selecting a domain risk threshold for at least one of said plurality of risk domains;
    a system element monitor operable to query said data processing system for an indication of presence of system elements;
    a risk quantizer for evaluating a system element for element risk and for computing the potential contribution of said element risk to a domain risk total;

a risk threshold comparator for comparing said domain risk total with said domain risk threshold; and a domain assignor operable to assign said system element to a risk domain in dependency upon an output of said risk threshold comparator.

2. The apparatus for controlling operational risk in a data processing system of claim 1, wherein said domain risk total is increased for a positive value of said potential contribution and decreased for a negative value of said potential contribution.

3. The apparatus for controlling operational risk in a data processing system of claim 1, wherein said risk threshold is operable as at least one of:

a budget value to be drawn from by a risk value drawer operating subtractively using one or more said element risk values; and an upper limit to be approached by a risk value accumulator operating additively using one or more said element risk values.

4. The apparatus for controlling operational risk in a data processing system of claim 3, wherein said system element comprises at least one of an application, a host system, a data storage system, an I/O system and a data communication system.

5. The apparatus for controlling operational risk in a data processing system of claim 4, wherein said element risk value comprises at least one of a weighting factor for criticality of function and an element reliability factor.

6. The apparatus for controlling operational risk in a data processing system of claim 2, wherein said risk threshold is operable as at least one of:

a budget value to be drawn from by a risk value drawer operating subtractively using one or more said element risk values; and an upper limit to be approached by a risk value accumulator operating additively using one or more said element risk values.

7. The apparatus for controlling operational risk in a data processing system of claim 6, wherein said system element comprises at least one of an application, a host system, a data storage system, an I/O system and a data communication system.

8. The apparatus for controlling operational risk in a data processing system of claim 7, wherein said element risk value incorporates at least one of a weighting factor for criticality of function and an element reliability factor.

9. A method for controlling operational risk in a data processing system comprising:

segmenting, by a risk domain segmenter, said data processing system into a plurality of risk domains;

selecting, by a domain risk threshold selector, a domain risk threshold for at least one of said plurality of risk domains;

querying, by a system element monitor, said data processing system for an indication of presence of system elements;

evaluating, by a risk quantizer, a system element for element risk and computing a potential contribution of said element risk to a domain risk total;

comparing, by a risk threshold comparator, said domain risk total with said domain risk threshold; and assigning, by a domain assignor, said system element to a risk domain in dependency upon an output of said risk threshold comparator.

10. The method for controlling operational risk in a data processing system of claim 9, wherein a positive value of said potential contribution increases said domain risk total and a negative value of said potential contribution decreases said domain risk total.

11. The method for controlling operational risk in a data processing system of claim 9 wherein said risk threshold is operable as at least one of:

a budget value to be drawn from by a risk value drawer operating subtractively using one or more said element risk values; and an upper limit to be approached by a risk value accumulator operating additively using one or more said element risk values.

12. The method for controlling operational risk in a data processing system of claim 10, wherein said risk threshold is operable as at least one of:

a budget value to be drawn from by a risk value drawer operating subtractively using one or more values of said element risk; and an upper limit to be approached by a risk value accumulator operating additively using one or more values of said element risk.

13. A computer-program product for controlling operational risk in a data processing system, comprising:

a non-transitory computer-readable medium;

means, provided on the computer-readable medium, for segmenting said data processing system into a plurality of risk domains;

means, provided on the computer-readable medium, for selecting a domain risk threshold for at least one of said plurality of risk domains;

means, provided on the computer-readable medium, for querying said data processing system for an indication of presence of system elements;

means, provided on the computer-readable medium, for evaluating a system element for element risk and computing the potential contribution of said element risk to a domain risk total;

means, provided on the computer-readable medium, for comparing said domain risk total with said domain risk threshold; and means, provided on the computer-readable medium, for assigning said system element to a risk domain in dependency upon an output of said risk threshold comparator.

14. The computer-program product for controlling operational risk in a data processing system of claim 13, further comprising means, provided on the computer-readable medium, for increasing the domain risk total for a positive value of the potential contribution and decreasing the domain risk total for a negative value of the potential contribution.

15. The computer-program product for controlling operational risk in a data processing system of claim 14, wherein said risk threshold corresponds to at least one of a budget value to be drawn from by a risk value drawer operating subtractively using one or more said element risk values and an upper limit to be approached by a risk value accumulator operating additively using one or more values of said element risk.

16. A computer implemented method of deploying a service comprising steps of deploying computer program code operable to, when deployed into a computer infrastructure and executed thereon, cause said computer system to perform steps comprising:

segmenting, by a risk domain segmenter, said data processing system into a plurality of risk domains;

selecting, by a domain risk threshold selector, a domain risk threshold for at least one of said plurality of risk domains;

querying, by a system element monitor, said data processing system for an indication of presence of system elements;

evaluating, by a risk quantizer, a system element for element risk and computing a potential contribution of said element risk to a domain risk total;

comparing, by a risk threshold comparator, said domain risk total with said domain risk threshold; and assigning, by a domain assignor, said system element to a risk domain in dependency upon an output of said risk threshold comparator.

17. The computer implemented method of claim 16, wherein a positive value of said potential contribution increases said domain risk total and a negative value of said potential contribution decreases said domain risk total.

18. The computer implemented method of claim 17, wherein said risk threshold is operable as at least one of:

a budget value to be drawn from by a risk value drawer operating subtractively using one or more said element risk values; and an upper limit to be approached by a risk value accumulator operating additively using one or more said element risk values.

* * * * *